United States Patent
Nonaka et al.

(10) Patent No.: US 8,390,458 B2
(45) Date of Patent: Mar. 5, 2013

(54) WIRELESS IC TAG READER

(75) Inventors: Nobuyuki Nonaka, Koto-ku (JP); Toshimi Koyama, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 750 days.

(21) Appl. No.: 12/205,977

(22) Filed: Sep. 8, 2008

(65) Prior Publication Data

US 2009/0079543 A1 Mar. 26, 2009

(30) Foreign Application Priority Data

Sep. 25, 2007 (JP) ................................ 2007-246540

(51) Int. Cl.
*G08B 13/14* (2006.01)
*H03C 7/02* (2006.01)

(52) U.S. Cl. ..................................... 340/572.7; 455/101

(58) Field of Classification Search .... 340/572.1–572.7, 340/10.1, 10.2, 10.31–10.34, 568, 825.54; 455/101, 67.11

See application file for complete search history.

(56) References Cited

U.S. PATENT DOCUMENTS

| 5,519,381 | A  | * | 5/1996 | Marsh et al. | 340/10.2 |
| 7,199,719 | B2 | * | 4/2007 | Steinberg | 340/572.8 |
| 7,513,431 | B2 | * | 4/2009 | Chiu | 235/472.02 |
| 7,701,351 | B2 | * | 4/2010 | Kawai et al. | 340/572.7 |
| 7,724,140 | B2 | * | 5/2010 | Saito et al. | 340/572.7 |
| 2007/0037529 | A1 | * | 2/2007 | Nagai et al. | 455/101 |
| 2007/0224942 | A1 | * | 9/2007 | Kuramoto et al. | 455/67.11 |
| 2007/0273530 | A1 | * | 11/2007 | Koezuka et al. | 340/572.7 |
| 2010/0182129 | A1 | * | 7/2010 | Hyde et al. | 340/10.2 |

FOREIGN PATENT DOCUMENTS

JP 2006-20083 1/2006

* cited by examiner

*Primary Examiner* — Benjamin C Lee
*Assistant Examiner* — Sigmund Tang
(74) *Attorney, Agent, or Firm* — Lexyoume IP Meister, PLLC.

(57) ABSTRACT

A wireless IC tag reader includes a receiving antenna, a transmitting antenna and a beam direction control unit. The receiving antenna has a maximum beam direction and a half-value angle. The transmitting antenna has a maximum beam direction and a half-value angle narrower than the half-value angle of the receiving antenna. The beam direction control unit changes the maximum beam direction of the transmitting antenna.

8 Claims, 8 Drawing Sheets

WIRELESS IC TAG READER

CROSS REFERENCE TO RELATED APPLICATION

This application claims benefit of priority under 35 U.S.C. §119 to Japanese Patent Application No. 2007-246540, filed on Sep. 25, 2007, the entire contents of which are incorporated by reference herein.

BACKGROUND OF THE INVENTION

1. Field of the Invention

The present invention relates to a wireless IC tag reader, and more specifically relates to a wireless IC tag reader having a function for reading information stored in a wireless IC tag (the wireless IC tag is also called an electronic tag or a radio frequency identification (RFID) tag).

2. Description of the Related Art

An RFID technique is recently used. In the RFID technique, a tag communication device (wireless IC tag reader) which is a reader or a reader/writer carries out wireless-communication with a wireless IC tag to read information stored in the wireless IC tag remotely. Especially, the wireless IC tag is expected as an alternative to a bar-code in a physical distribution field. In the near feature, it is predicted that the RFID technique spreads widely.

For example, the RFID technique is applied to detection to be carried out when a product enters into or leaves from a warehouse or a store. In this case, it is important to surely read multiple pieces of information stored in wireless IC tags incorporated in products within a communication area. Generally, in the communication area, there are weaker radio wave spot areas (these areas are also called field holes, dead spots or null points) where radio waves from a wireless IC tag reader interfere with each other on multiple paths by reflection phenomena and the radio waves are almost canceled. If a wireless IC tag is located in a dead spot, it is difficult or impossible for the wireless IC tag reader to read information stored in the wireless IC tag.

As a method for resolving the above-described problem, Japanese Patent Application Laid-Open No. 2006-20083 discloses a control method for electronically controlling directional characteristics (angular characteristics) of radio waves to be transmitted by a wireless IC tag reader (see paragraphs [0054] to [0059] and FIG. 2).

In the control method, a common type in which antennas for transmitting radio waves and receiving response waves are commoditized is employed. However, it is difficult to separate a response wave transmitted by a wireless IC tag from a radio wave transmitted by a wireless IC tag reader because the intensity of response wave is remarkably lower than that of radio waves transmitted by the wireless IC tag reader. In order to resolve the above-described problem, a separate type in which antennas for transmitting radio waves and receiving response waves are separated is recently employed.

The separate type however increases a cost because the antennas for transmitting radio waves and receiving response waves are separated. Further, if a radio wave transmitted from the separate type antenna has relatively high intensity so as to be uniformly transmitted to a wide area while being kept at a certain level, the dead spots still appear in a communication area.

SUMMARY OF THE INVENTION

It is an object of the present invention to provide a wireless IC tag reader, in which a receiving antenna with a relatively wide half-value angle and a transmitting antenna with a relatively narrow half-value angle having a directivity angle control function are combined, capable of overcoming the above-described defects and keeping high performance in separate type.

In order to achieve the object, the present invention provides a wireless IC tag reader comprising: a receiving antenna with a maximum beam direction and a half-value angle; a transmitting antenna with a maximum beam direction and a half-value angle narrower than the half-value angle of the receiving antenna; and a maximum beam direction changing unit that changes the maximum beam direction of the transmitting antenna.

According to the present invention, the wireless IC tag reader can prevent a direct radio wave which is transmitted from the transmitting antenna and a reflected radio wave which is reflected on a floor surface or a wall surface of a room where a wireless IC tag is put, from interfering each other, in the vicinity of a position where the wireless IC tag is put. Therefore, the wireless IC tag reader can prevent a dead spot where radio waves are almost canceled by the interference from appearing. As a result, the wireless IC tag reader surely reads information stored in the wireless IC tag reader.

In a preferred embodiment of the present invention, the maximum beam direction changing unit pivots the maximum beam direction of the transmitting antenna along a vertical direction with respect to a floor surface of a room where a wireless IC tag is put.

According to the embodiment, the maximum beam direction changing unit can pivot the maximum beam direction of the transmitting antenna so as not to occur the reflected radio wave. Therefore, the wireless IC tag reader can prevent a dead spot where radio waves are almost canceled by the interference from appearing. As a result, the wireless IC tag reader surely reads information stored in the wireless IC tag reader.

In a preferred embodiment of the present invention, the maximum beam direction of the transmitting antenna is set to point away from a position where the wireless IC tag is put in the vicinity of the floor surface while a main lobe of the transmitting antenna encompasses the position.

According to the embodiment, the maximum beam direction changing unit sets the maximum beam direction of the transmitting antenna so that the maximum beam direction points away from a position where the wireless IC tag is put in the vicinity of the floor surface and the main lobe of the transmitting antenna encompasses the position, by pivoting the maximum beam direction along the vertical direction with respect to the floor surface.

In a preferred embodiment of the present invention, if the maximum beam direction of the transmitting antenna approaches a wall surface of the room by being pivoted along the vertical direction, the maximum beam direction changing unit continuously pivots the maximum beam direction of the transmitting antenna along a horizontal direction with respect to the floor surface so that the maximum beam direction of the transmitting antenna is away from the wall surface while the main lobe of the transmitting antenna encompasses the position.

According to the embodiment, the maximum beam direction changing unit can pivot the maximum beam direction of the transmitting antenna so as not to occur the reflected radio wave on the floor surface and the wall surface of the room. Therefore, the wireless IC tag reader can prevent a dead spot where radio waves are almost canceled by the interference from appearing. As a result, the wireless IC tag reader surely reads information stored in the wireless IC tag reader.

In a preferred embodiment of the present invention, a main lobe of the receiving antenna encompasses the whole space in a room where a wireless IC tag is put.

According to the embodiment, the main lobe of the receiving antenna encompasses the whole space in the room. Therefore, the wireless IC tag reader can receive well a response wave from the wireless IC tag using only the receiving antenna.

In order to achieve the object, the present invention provides a wireless IC tag reader comprising: a receiving antenna with a maximum beam direction and a half-value angle; transmitting antennas each with a maximum beam direction and a half-value angle narrower than the half-value angle of the receiving antenna; and a maximum beam direction changing unit that changes the maximum beam directions of the transmitting antennas so that the maximum beam directions differ from each other.

According to the present invention, the wireless IC tag reader can prevent a direct radio wave which is transmitted from the transmitting antenna and a reflected radio wave which is reflected on a floor surface or a wall surface of a room where a wireless IC tag is put, from interfering each other, in the vicinity of a position where the wireless IC tag is put. Also, the wireless IC tag reader does not need to carry out multiple scans in the whole space of the room. Therefore, the wireless IC tag reader can prevent a dead spot where radio waves are almost canceled by the interference from appearing and increase the efficiency of reading information stored in the wireless IC tag. As a result, the wireless IC tag reader surely and rapidly reads information stored in the wireless IC tag reader.

Figure 1:
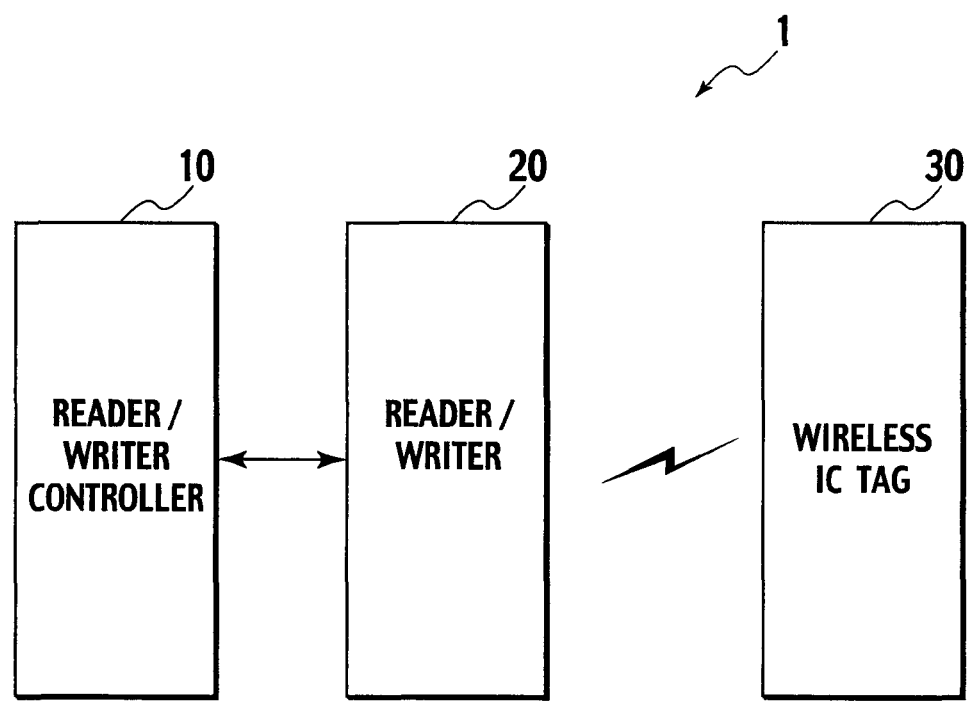
FIG. 1 is a block diagram of a wireless IC tag reading system according to an exemplary embodiment of the present invention.

DESCRIPTION OF THE PREFERRED
EMBODIMENTS

With reference to FIGS. 1 to 8, an exemplary embodiment of the present invention will be described below.

A wireless IC tag reading system 1 comprises a reader/writer controller 10, a reader/writer 20 and wireless IC tags 30. The reader/writer 20 is connected to the reader/writer controller 10 and reads information stored in each wireless IC tag 30 remotely. The reader/writer 20 is one example of a wireless IC tag reader of the present invention.

The reader/writer controller 10 orders the reader/writer 20 to read information stored in a target wireless IC tag 30, orders the reader/writer 20 to send the read information (e.g., a unique ID) thereto, stores the sent information therein, and carries out a certain information process to the stored information (e.g., displaying a list of stocks). For example, the reader/writer controller 10 is a computer or various controllers.

The reader/writer 20 remotely reads information stored in each wireless IC tag 30 which is a memory medium, or writes new information into information stored in each wireless IC tag 30, by means of a wireless communication (e.g., invocation of data, registration of data, deletion of data, or update of data).

Figure 2:
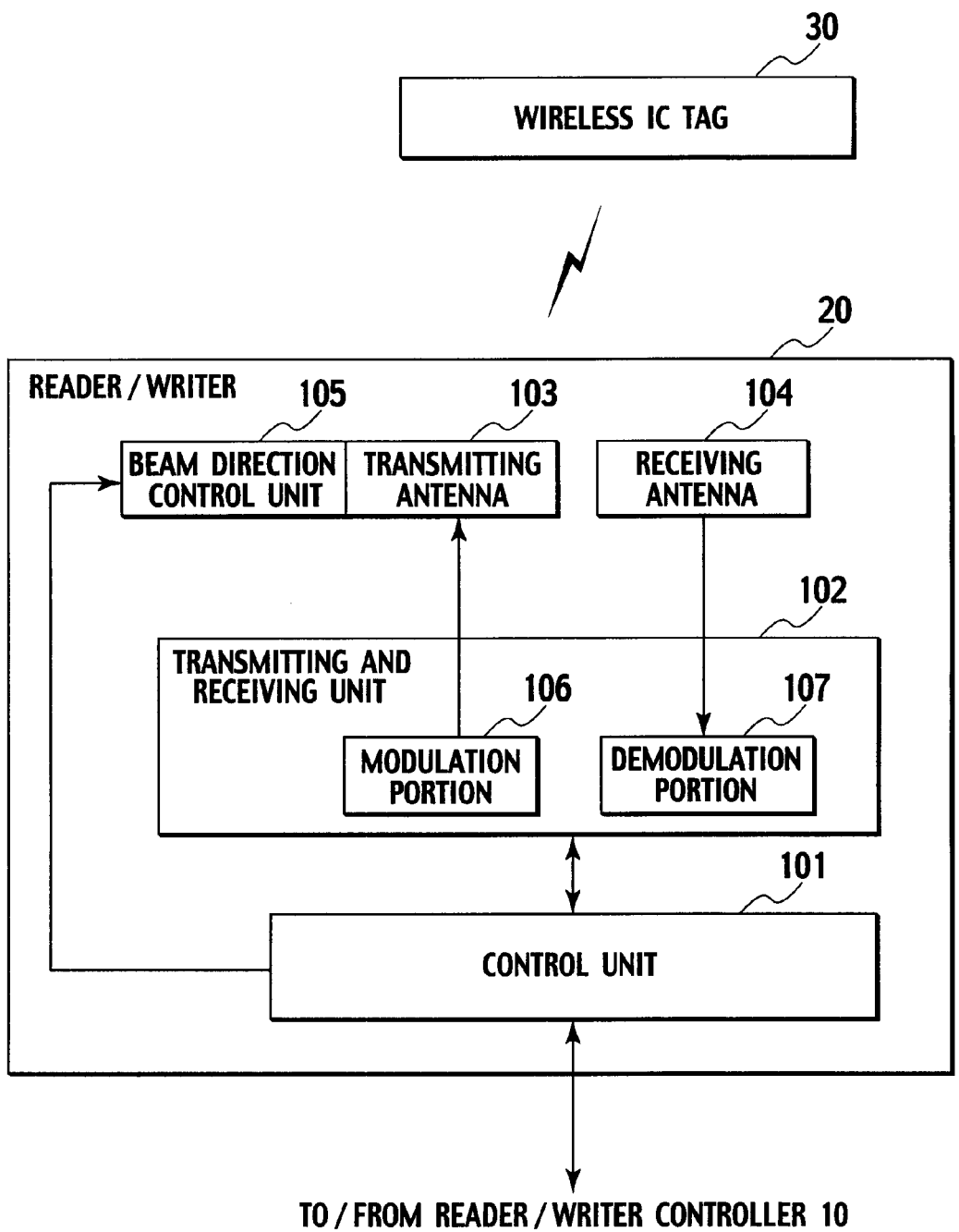
FIG. 2 is a block diagram of a reader/writer according to the exemplary embodiment of the present invention.

As shown in FIG. 2, the reader/writer 20 comprises a control unit 101, a transmitting and receiving unit 102, a transmitting antenna 103, a receiving antenna 104 and a beam direction control unit 105. The transmitting and receiving unit 102 is connected to the controller 101. The transmitting antenna 103 and the receiving antenna 104 are connected to the transmitting and receiving unit 102. The beam direction control unit 105 is connected to the controller 101 and the transmitting antenna 103 and changes a maximum beam direction of the transmitting antenna 103. The beam direction control unit 105 is one example of a maximum beam direction changing unit of the present invention.

The control unit 101 receives an order signal from the reader/writer controller 10 to drive the transmitting and receiving unit 102 and the beam direction control unit 105 so that the transmitting and receiving unit 102 transmits radio waves from the transmitting antenna 103 to a target wireless IC tag 30 in cooperation with the beam direction control unit 105, in order to receive information from the target wireless IC tag 30 via the receiving antenna 104. When the control unit 101 drives the beam direction control unit 105, the control unit 101 sends a direction changing order signal to the beam direction control unit 105 to order the beam direction control unit 105 to change the maximum beam direction of the transmitting antenna 103.

The control unit 102 sends information, which has been read from a target wireless IC tag 20, from the transmitting and receiving unit 102 to the reader/writer controller 10. For example, the control unit 101 is a microcomputer having a CPU, a ROM and a RAM.

The transmitting and receiving unit 102 transmits information to a target wireless IC tag 30 via the transmitting antenna 103 in cooperation with the beam direction control unit 105, and receives information from a target wireless IC tag 30 via the receiving antenna 104. More specifically, the transmitting and receiving unit 102 has a modulation portion 106 and a demodulation portion 107. The modulation portion 106 modulates a carrier wave in a predetermined modulation scheme according to a base signal related to information such as a command, a request or an order, from the control unit 101 to generate a modulation wave. The demodulation portion 107 demodulates a modulation wave from the target wireless IC tag 30 to extract a base signal related to information stored in the target wireless IC tag 30, and then sends the base signal to the control unit 101. For example, the transmitting and receiving unit 102 is a RF module having a modulation circuit and a demodulation circuit.

The transmitting antenna 103 transmits into the air the modulation wave from the modulation portion 106 of the transmitting and receiving unit 102 to emit radio waves toward a target wireless IC tag 30. The transmitting antenna 103 is an antenna with directional characteristics and has a maximum beam direction in which the electronic power of radio wave transmitted into the air is the largest. For example, the transmitting antenna 103 is a phased array antenna composed of a dipole antenna or a patch antenna or composed of dipole antennas or patch antennas.

The maximum beam direction of the transmitting antenna 103 is mechanically or electronically changed by the beam direction control unit 105.

In a case where the maximum beam direction of the transmitting antenna 103 is mechanically changed, the beam direction control unit 105 is composed of a stepping motor and a control circuit of the stepping motor. The beam direction control unit 105 pivots the transmitting antenna 103 pivotably mounted on a central fixed portion to change the maximum beam direction of the transmitting antenna 103 so that the maximum beam direction points toward a target wireless IC tag 30.

On the other hand, in a case where the maximum beam direction of the transmitting antenna 103 is electronically changed, the beam direction control unit 105 is composed of a distributing and synthesizing portion and phase shift portions. The transmitting antenna 103 is composed of antenna elements arranged in line. A modulation wave, which is input into the distributing and synthesizing portion, is distributed to the phase shift portions. Each phase shift portion carries out a phase variation with respect to the distributed modulation wave so that the distributed modulation wave has a desired phase. Then, the distributed modulation wave is transmitted from an antenna element connected to the phase shift portion. Each phase shift portion carries out the phase variation based on an order from the control unit 101, which can change a direction in which radio waves travel and each phase of radio wave transmitted from each antenna element is the same as other phases of radio waves transmitted from other antenna elements.

In this embodiment, although a direction in which the maximum beam direction of the transmitting antenna 103 is changed is a vertical direction with respect to a floor surface of a room where the wireless IC tags 30 are put, the direction in which the maximum beam direction of the transmitting antenna 103 is changed may be a horizontal direction with respect to the floor surface of the room or may be both of the vertical and horizontal directions. Especially, in a case where the maximum beam direction approaches a wall surface of the room when being changed along the vertical direction, the maximum beam direction is continuously changed along the horizontal direction so as to be away from the wall surface.

The receiving antenna 104 receives a response wave on which a faint response signal, which is generated when a radio wave transmitted from the transmitting antenna 103 is received by a target wireless IC tag 30, is superimposed. Then, the receiving antenna 104 sends the received response wave to the transmitting and receiving unit 102. The transmitting and receiving unit 102 extracts the superimposed response signal from the response wave and sends the response signal to the control unit 101.

Figure 3:
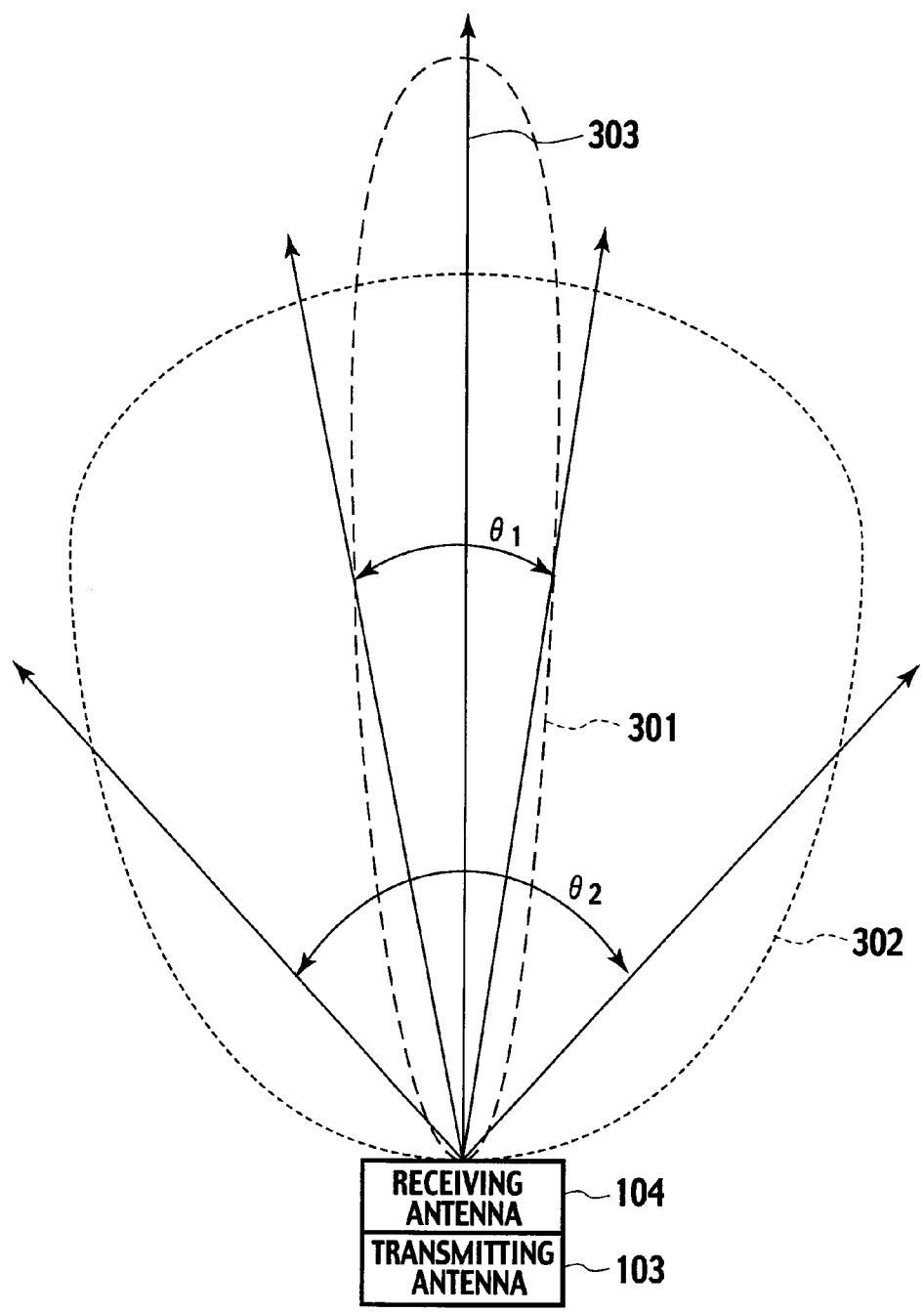
FIG. 3 is an explanatory diagram of a main lobe shape and a half-value angle of a transmitting antenna and ones of a receiving antenna according to the exemplary embodiment of the present invention.

As shown in FIG. 3, a half-value angle $\theta 1$ of a main lobe 301 of the transmitting antenna 103 is set to be smaller than a half-value angle $\theta 2$ of a main lobe 302 of the receiving antenna 104. The maximum beam direction 303 of the transmitting antenna 103 overlaps that of the receiving antenna 104. However, the maximum beam direction 303 of the transmitting antenna 103 may differ from that of the receiving antenna 104 because the beam direction control unit 105 is capable of changing the maximum beam direction of the transmitting antenna 103.

Next, with reference to FIGS. 4 to 6, the action of the wireless IC tag reading system 1 that changes the maximum beam direction of the transmitting antenna 103 and reads information stored in a target wireless IC tag 30 will be described below in detail.

Figure 4:
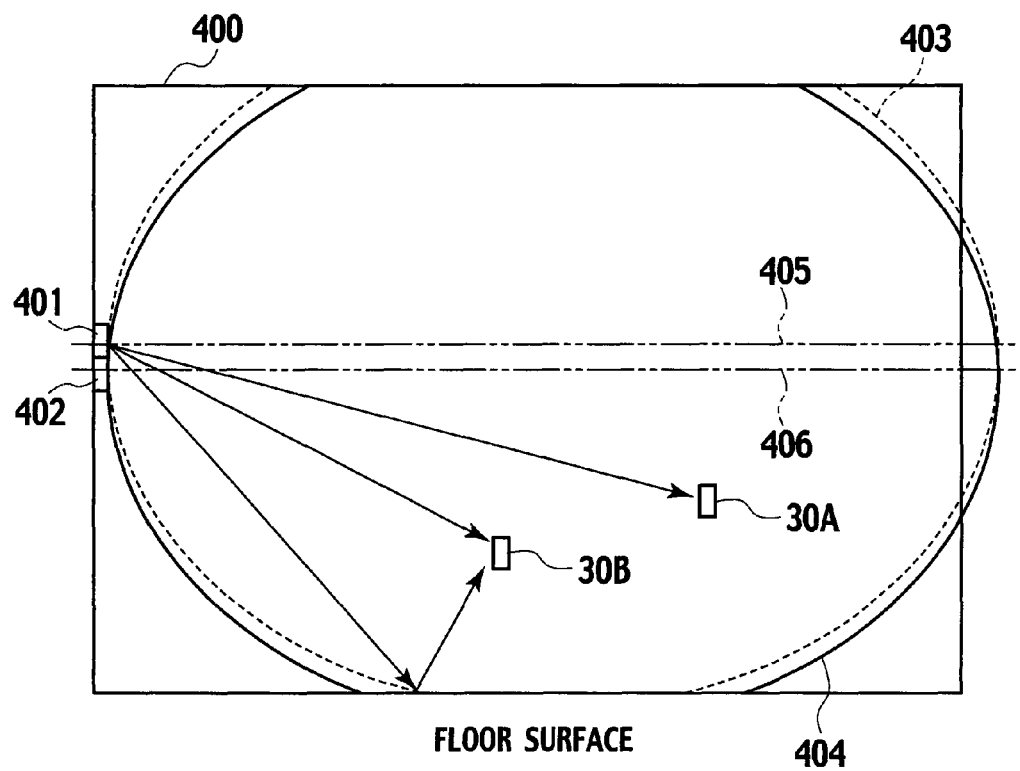
FIG. 4 is an explanatory diagram of positional relation between a main lobe of a conventional transmitting antenna and one of a conventional receiving antenna.

FIG. 4 shows traveling paths of radio waves, in a situation where a conventional reader/writer reads two pieces of information stored in wireless IC tags 30A, 30B put in a room 400 using a transmitting antenna 401 and a receiving antenna 402 thereof. In the conventional reader/writer, a half-value angle of a main lobe 403 of the transmitting antenna 401 is relatively wide and is about the same as a half-value angle of a main lobe 404 of the receiving antenna 402, and a shape of the main lobe 403 of the transmitting antenna 401 is about the same as a shape of the main lobe 404 of the receiving antenna 402.

The transmitting antenna 401 and the receiving antenna 402 are set in the room 400 so that a maximum beam direction 405 of the transmitting antenna 401 and a maximum beam direction 406 of the receiving antenna 402 are substantially parallel to a floor surface of the room 400.

In the room 400, the wireless IC tags 30A, 30B are put in positions shown in FIG. 4. Since the wireless IC tag 30A is put in a position where there is not a dead spot where radio waves from the transmitting antenna 401 interfere with each other on the traveling paths by reflection phenomena and the radio waves are almost canceled, the wireless IC tag 30A can sufficiently respond to radio waves from the transmitting antenna 401. Therefore, the receiving antenna 402 can receive a response wave from the wireless IC tag 30A to read information stored in the wireless IC tag 30A.

On the other hand, since the wireless IC tag 30B is put in a position where there is the dead spot, the wireless IC tag 30B is hard to respond to radio waves from the transmitting antenna 401. Therefore, it is difficult or impossible for the receiving antenna 402 to read information stored in the wireless IC tag 30A.

Figure 5:
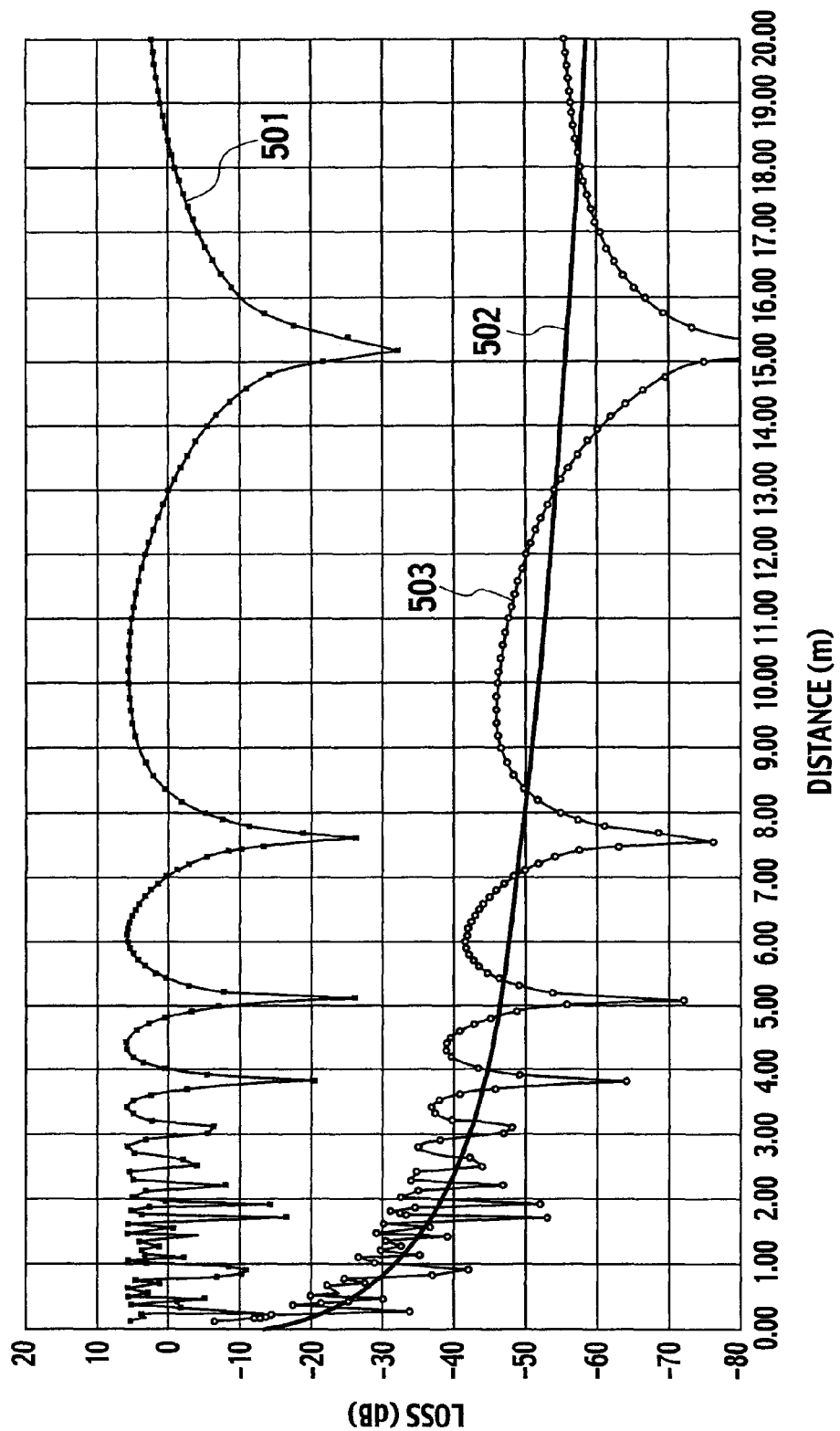
FIG. 5 is a graph obtained by a computer simulation regarding interference between a direct radio wave and a reflected radio wave in the conventional transmitting antenna.

FIG. 5 shows a graph obtained by a computer simulation regarding interference between a direct radio wave and a reflected radio wave reflected on a floor surface of a room in a conventional transmitting antenna, under a condition where the conventional transmitting antenna with a wide half-value angle is set at a certain height.

A horizontal axis of the graph shows a distance from the transmitting antenna. A vertical axis of the graph shows an amount of loss-attenuation of a radio wave from the transmitting antenna. An attenuation curve 501 shows an amount of loss-attenuation by interference between a direct radio wave and a reflected radio wave at each distance from the transmitting antenna, using a computer simulation. An attenuation curve 502 shows an amount of loss-attenuation of a radio wave from the transmitting antenna in free-space at each distance from the transmitting antenna, using a computer simulation. An attenuation curve 503 is a curve obtained by adding the attenuation curve 501 to the attenuation curve 502. The attenuation curve 503 duplicates real loss-attenuation of a radio wave from the transmitting antenna in the room. In the attenuation curve 503, there are plural points where an amount of loss-attenuation rapidly becomes large. These points correspond to the dead spots. When a wireless IC tag 30 is put at one of these points in the room, the wireless IC tag 30 is hard to respond to radio waves from the transmitting antenna. Therefore, it is difficult or impossible for a receiving antenna to read information stored in the wireless IC tag 30.

Figure 6:
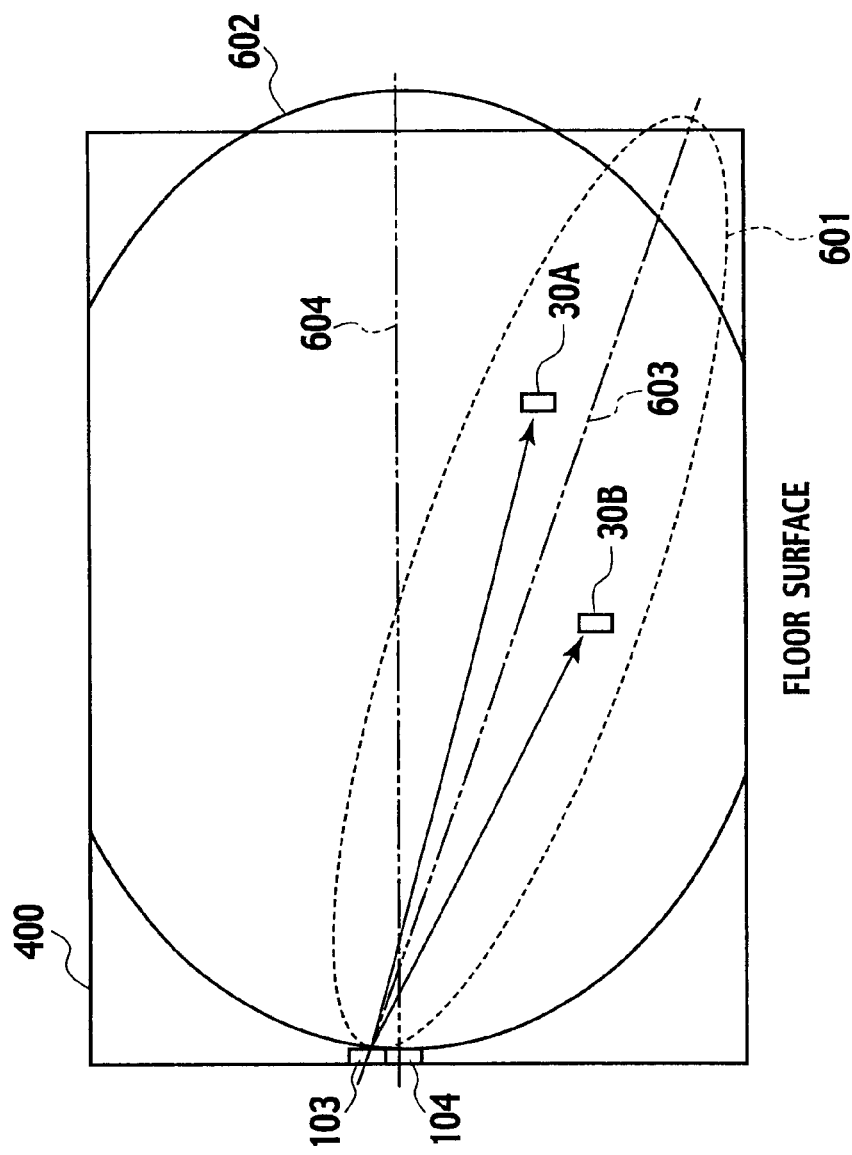
FIG. 6 is an explanatory diagram of positional relation between a main lobe of the transmitting antenna and one of the receiving antenna according to the exemplary embodiment of the present invention.

FIG. 6 shows traveling paths of radio waves, in a situation where the reader/writer 20 reads two pieces of information stored in the wireless IC tags 30A, 30B put in the room 400 using the transmitting antenna 103 and the receiving antenna 104 thereof. In the reader/writer 20, a half-value angle of a main lobe 601 of the transmitting antenna 103 is narrower than a half-value angle of a main lobe 602 of the receiving antenna 104, and a shape of the main lobe 601 of the transmitting antenna 103 is flatter than a shape of the main lobe 602 of the receiving antenna 104.

The transmitting antenna 103 and the receiving antenna 104 are set in the room 400 so that a maximum beam direction 601 of the transmitting antenna 103 directs toward the floor surface of the room 400 so as to read two pieces of information stored in the wireless IC tags 30A, 30B and a maximum beam direction 604 of the receiving antenna 104 is the same as the maximum beam direction 406 of the receiving antenna 402. It is noted that positions where the wireless IC tags 30A, 30B are put in the room 400 in FIG. 6 are the same as the positions where the wireless IC tags 30A, 30B are put in the room 400 in FIG. 4.

In this condition, the radio waves from the transmitting antenna 103 reach the wireless IC tags 30A, 30B without diffusing because the half-value angle of the main lobe 601 of the transmitting antenna 103 is relatively narrow. This prevents the radio waves from the transmitting antenna 103 from being reflected on the floor surface in the vicinity of the positions where the wireless IC tags 30A, 30B are put, which also prevents the dead spots from occurring in the vicinity of the positions where the wireless IC tags 30A, 30B are put. Therefore, the wireless IC tags 30A, 30B sufficiently response to the radio waves from the transmitting antenna 103. As a result, the receiving antenna 104 can receive response waves from the wireless IC tags 30A, 30B to surely read two pieces of information stored in the wireless IC tags 30A, 30B.

Thus, in the case where a target wireless IC tag 30 is positioned in the vicinity of the floor surface of the room, the maximum beam direction of the transmitting antenna 103 is set to point at the floor surface of the room away from the position where the target wireless IC tag 30 is put as possible while the main lobe of the transmitting antenna 103 encompasses the position where the target wireless IC tag 30 is put. Further, the half-value angle of the main lobe of the transmitting antenna 103 is set to be narrow as possible while the main lobe of the transmitting antenna 103 encompasses the position where the target wireless IC tag 30 is put. On the other hand, the maximum beam direction of the receiving antenna 104 is set to be substantially parallel to the floor surface and the main lobe of the receiving antenna 104 encompasses the whole space in the room as possible. By the setting, the reader/writer 20 resolves the conventional difficulty and/or failure of reading information stored in a target wireless IC tag put in the vicinity of the floor surface of the room. This increases a success percentage of wireless IC tags scattered within a reading area of reader/writer. Therefore, the reader/writer 20 can carry out a high-speed reading process for a plurality of wireless IC tags without causing unread information.

Next, with reference to FIG. 7, the structure of a wireless IC tag 30 will be described below in detail. Since the wireless IC tags 30 are identical to each other, only one wireless IC tag 30 is detailed.

Figure 7:
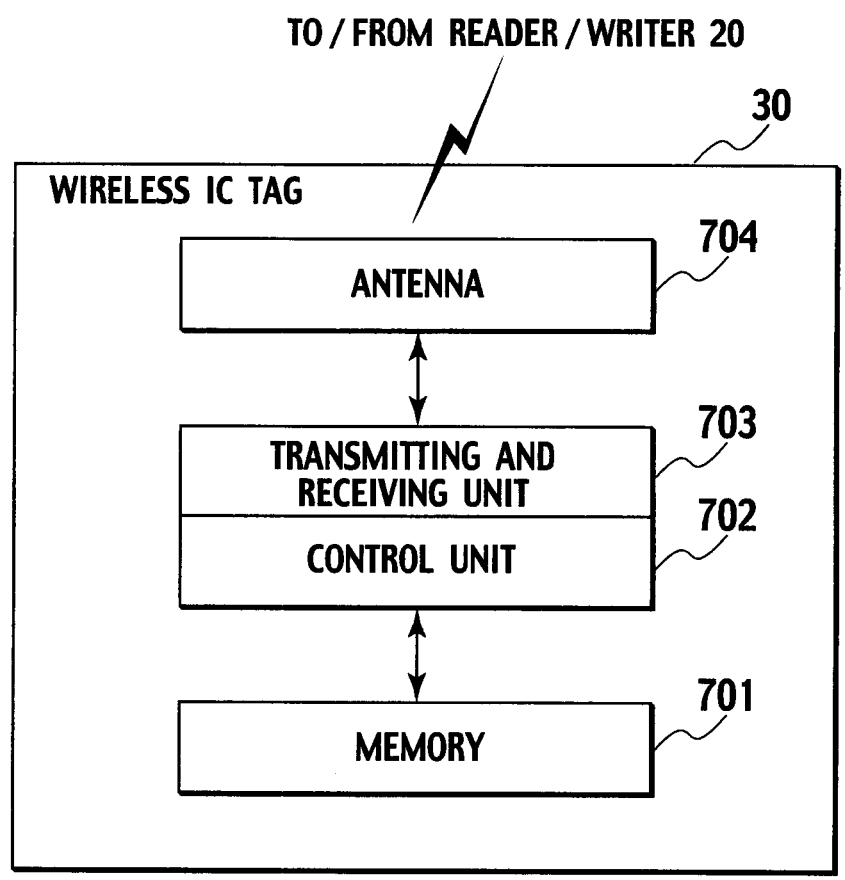
FIG. 7 is a block diagram of a wireless IC tag according to the exemplary embodiment of the present invention.

As shown in FIG. 7, the wireless IC tag 30 comprises a memory 701, a control unit 702, a transmitting and receiving unit 703 and an antenna 704. The memory 701 stores therein an identification code related to merchandise information, shipping side information or the like. This information will be read by the reader/writer 20. The control unit 702 responses to a command, a request or an order, from the reader/writer 20 to carry out various processes. The transmitting and receiving unit 703 has a modulation portion (not shown) and a demodulation portion (not shown) and carries out a modulation or demodulation of signal to remotely transmit or receive data to or from the reader/writer 20. The antenna 704 receives radio waves from the reader/writer 20 to supply electric power to the transmitting and receiving unit 703, and receives a modulation wave on which a faint response signal is superimposed from the transmitting and receiving unit 703 and transmits into the air the modulation wave to emit a response wave to the reader/writer 20.

Next, the advantageous technical features of the wireless IC tag reading system 1 will be described below.

Even if a target wireless IC tag 30 is positioned in the vicinity of a floor surface of a room, the wireless IC tag reading system 1 can prevent a dead spot from appearing in the vicinity of the position where a target wireless IC tag 30 is put, without reducing the performance of the separate type, by relatively narrowing the half-value angle of the main lobe of the transmitting antenna 103 in the reader/writer 20 as possible and pointing the maximum beam direction of the transmitting antenna 103 at the floor surface of the room away from the position where the target wireless IC tag 30 is put as possible while the main lobe of the transmitting antenna 103 encompasses the position where the target wireless IC tag 30 is put. Thus, the half-value angle of the main lobe of the transmitting antenna 103 is relatively narrowed as possible in the wireless IC tag reading system 1, which prevents radio waves transmitted from the transmitting antenna 103 from diffusing away from the target wireless IC tag 30 and being reflected on the floor surface of the room to interfere each other in the vicinity of the position where the target wireless IC tag 30 is put.

The wireless IC tag reading system 1 can communicate well with wireless IC tags 30 which are put within a communication area by repeatedly changing the maximum beam direction of the transmitting antenna 103 in the communication area.

The wireless IC tag reading system 1 can receive well response waves from wireless IC tags 30 which are put within a communication area using only the receiving antenna 104, as well as the conventional receiving antenna, by relatively widening the half-value angle of the main lobe of the receiving antenna 104 in the reader/writer 20 as possible.

Figure 8:
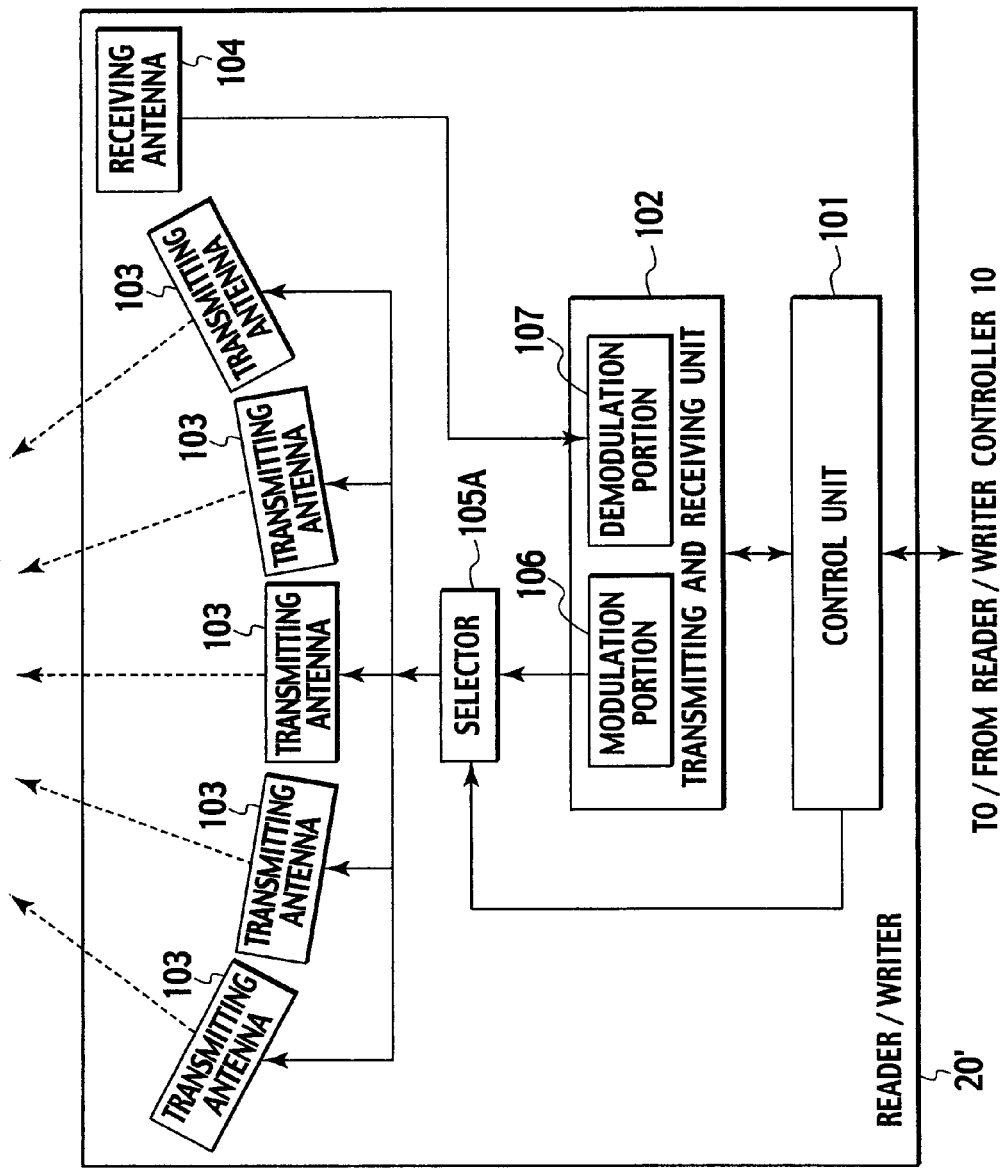
FIG. 8 is a block diagram of a reader/writer according to a modified exemplary embodiment of the present invention.

Next, with reference to FIG. 8, a modified exemplary embodiment of the present invention will be described below.

In this embodiment, the reader/writer 20 is replaced by a reader/writer 20'. As shown in FIG. 8, the reader/writer 20' comprises the control unit 101, the transmitting and receiving unit 102, a plurality of transmitting antennas 103, the receiving antenna 104 and a selector 105A. The plurality of transmitting and receiving antennas 103 is connected to the selector 105A. The selector 105A is connected to the control unit 101 and the modulation portion 106 of the transmitting and receiving unit 102.

The selector 105A functions as the maximum beam direction changing unit of the present invention and changes maximum beam directions of the transmitting antennas 103 so that the maximum beam directions differ from each other and main lobes of the transmitting antennas 103 cover the whole space in the room 400, according to the direction changing order signal from the control unit 101. When the selector 105A receives a modulation wave from the modulation portion 106, the selector 105A selects one transmitting antenna 103 from among the plurality of transmitting antennas 103 according to a control signal from the control unit 101 and sends the modulation wave to the one transmitting antenna 103. The transmitting antenna 103 which receives the modulation wave from the selector 105A transmits the modulation wave into the air to emit radio waves along the maximum beam direction thereof.

Under this configuration, since the transmitting antennas 103 are set in the reader/writer 20' so that the maximum beam directions differ from each other and the main lobes cover the whole space in the room 400, the wireless IC tag reading system 1 does not need to carry out multiple scans in the whole space of the room 400 in comparison with the exemplary embodiment of the present invention.

What is claimed is:

1. A wireless IC tag reader comprising:
   a receiving antenna with a maximum beam direction and a half-value angle;
   a transmitting antenna with a maximum beam direction and a half-value angle narrower than the half-value angle of the receiving antenna; and
   a maximum beam direction changing unit that changes the maximum beam direction of the transmitting antenna without changing the half-value angle of the transmitting antenna,
   wherein a main lobe of the receiving antenna encompasses the whole space in a communication region limited by a floor surface and a wall surface,
   and
   the maximum beam direction changing unit changes the maximum beam direction of the transmitting antenna such that a main lobe of the transmitting antenna encompasses a wireless IC tag in the communication region without encompassing the floor surface and the wall surface in the communication region.

2. The wireless IC tag reader according to claim 1, wherein the maximum beam direction changing unit pivots the maximum beam direction of the transmitting antenna along a vertical direction with respect to the floor surface in the communication region.

3. The wireless IC tag reader according to claim 2, wherein when the maximum beam direction of the transmitting antenna approaches the wall surface in the communication region by being pivoted along the vertical direction, the maximum beam direction changing unit continuously pivots the maximum beam direction of the transmitting antenna along a horizontal direction with respect to the floor surface such that the maximum beam direction of the transmitting antenna is away from the wall surface while the main lobe of the transmitting antenna encompasses the wireless IC tag.

4. A wireless IC tag reader comprising:
   a receiving antenna with a maximum beam direction and a half-value angle;
   transmitting antennas each with a maximum beam direction and a half-value angle narrower than the half-value angle of the receiving antenna; and
   a maximum beam direction changing unit that changes the maximum beam directions of the transmitting antennas without changing the half-value angles of the transmitting antennas such that the maximum beam directions differ from each other,
   wherein a main lobe of the receiving antenna encompasses the whole space in a communication region limited by a floor surface and a wall surface,
   and
   the maximum beam direction changing unit changes the maximum beam direction of each of the transmitting antennas such that a main lobe of one of the transmitting antenna encompasses a wireless IC tag in the communication region without encompassing the floor surface and the wall surface in the communication region.

5. The wireless IC tag reader according to claim 1, wherein the maximum beam direction changing unit changes the maximum beam direction of the transmitting antenna by pivoting the transmitting antenna mechanically using a stepping motor.

6. The wireless IC tag reader according to claim 1, wherein the half-value angles of the receiving antenna and the transmitting antenna are fixed.

7. The wireless IC tag reader according to claim 4, wherein the maximum beam direction changing unit changes the maximum beam directions of the transmitting antennas by pivoting the transmitting antennas mechanically using a stepping motor.

8. The wireless IC tag reader according to claim 4, wherein the half-value angles of the receiving antenna and the transmitting antenna are fixed.

* * * * *